FIG. 3
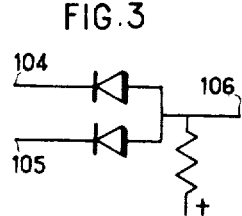
FIG. 3a
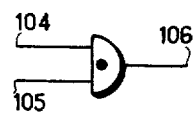
FIG. 4
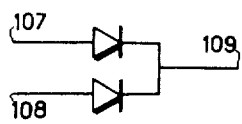
FIG. 4a
FIG. 5
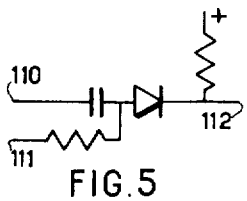
FIG. 5a

United States Patent Office 3,349,376
Patented Oct. 24, 1967

3,349,376
DATA HANDLING AUTOMATIC SYSTEM
Claude Jean Baptiste Bouvier, Villiers sur Marne, France, assignor to Compagnie des Machines Bull (Societe Anonyme), Paris, France
Filed Mar. 3, 1964, Ser. No. 349,083
Claims priority, application France, Mar. 13, 1963, 927,817
7 Claims. (Cl. 340—172.5)

The present invention relates to a system for automatically handling data stored in a memory, the said memory being associated with an electronic data-processing machine.

Electronic data-processing machines and more particularly electronic computers comprise many independent functional units such as card or perforated-tape readers, magnetic drums, calculating members, printers, etc., which may or may not be synchronised with one another and are adapted to operate at different speeds. In accordance with a known technique these units, hereinafter called peripheral units, are arranged around a central unit with which they can perform data transfers, in accordance with the directions of a registered program. The data emanating from or proceeding to the peripheral elements generally pass through a central memory, attached to the central unit, which serves as an intermediate storage device for the majority of the data exchanged in the machine.

It is often desirable that the operating rate of the peripheral units should not be slowed down, or at least should be slowed down as little as possible, by the introduction of the data into the central memory or their extraction therefrom. It is therefore important, on the one hand, that the central memory should have available a sufficient capacity for storing the data and that, on the other hand, it should be possible for the data to be introduced into or extracted from the store in a minimum time.

The central memory generally consists of a matrix of storage elements, which elements may be magnetic cores, ferroelectric elements or any other type of storage elements having two states, in which registration positions serve to store characters in accordance with a pre-established binary code, so that each character registered in a particular location in the memory occupies, for its representation, a predetermined number of binary positions. The location of each character in the memory is defined by a quantity called an address, each location in the memory being defined by an address which is peculiar thereto.

Memories are known which are of the direct-access type, that is to say, in which any character contained in a memory can be selected, independently of the contents of the said memory, any selection effected from the ordinates of the said memory, as a function of a predetermined address, then selecting the character situated in the location defined by this address. This type of memory makes it possible to extract or store data rapidly, which is particularly useful in cases where the capacity of the memory is already considerable, such capacity generally varying from 2000 to 100,000 characters. However, this type of memory has disadvantages owing to the fact that it necessitates complex and costly selecting circuits for effecting the introduction of the data into the memory or their extraction therefrom. Moreover, for a rational use of this type of memory, it is necessary for the programmer to concern himself constantly, throughout the preparation of a programme, with the positioning, in the memory, of the data which are to be stored therein. Consequently, the programming of the machine utilising such a memory becomes relatively complex, above all if the data intended to be stored consist of words of variable length, that is to say, of words comprising a variable number of characters. There are in fact many applications, such as computation and registration, in which a word is extracted from the memory and in which the place in the memory which is made available in consequence of this extraction is re-used either to store the word previously extracted or to store any other word having a length equal to or smaller than that of the extracted word. However, it is not possible with this procedure to utilize the memory in a rational manner owing to the fact that the words which are stored do not always fill the available place offered to them. For example, the place made available by the extraction of a five-character word cannot be utilised to accommodate a six-character word, while the use of this place for accommodating a three-character word would leave available in the memory a place for two characters which generally cannot be used for the registration.

All these considerations therefore show how necessary it is for the programmer to know exactly the place of the data in the memory.

It has been proposed to avoid this disadvantage by employing devices by means of which it is possible to extract a word from or to introduce a word into a memory and which, in the case of an extraction, order the shifting of the stored data so that the words are stored in the memory one after the other in a continuous sequence of characters. The beginning of each word may be identified by means of a sign allotted to the first character of each word, or by means of a special character or symbol, disposed between the last character of a word and the first character of the succeeding word. However, these devices comprise counting members for counting the number of characters constituting each word, which further complicates the construction of the machine.

In accordance with the present invention, it is proposed to obviate the disadvantages of the prior art by means of a system for the automatic handling of the data stored in a memory, which renders possible a rational use of said memory, while freeing the programmer from the necessity to take account of the positioning of the data therein. This automatic handling is rendered possible by gathering the stored data, in a continuous sequence of characters, during the introduction of a word into the memory, always beginning with the least significant ordered columns thereof. In this way, instead of concerning himself with the positioning of the data in the memory, the programmer has only to know the total available capacity, in characters, for the registration of further data.

In accordance with the invention there is provided, in an electronic data-processing machine comprising a memory having a plane matrix consisting of a series of columns of bistable elements for the registration of data, associated with a first column selecting switch adapted to advance step by step under the action of pulses supplied by a pulse generator and capable of bringing about an extraction of registered data, character by character, and associated with a second column selecting switch adapted to advance step by step and capable of normally bringing about the re-registration of the extracted data, character by character, the data being initially registered in a continuous sequence of columns, at a rate of one character per column, forming words which comprise a variable number of characters, each word comprising a special character called a coded mark followed by normal characters, an arrangement for extracting a word from the memory and assembling the remaining words in a continuous sequence of least significant ordered columns, the said arrangement comprising a comparison register containing a coded mark identical to that identifying the word to be extracted from the memory, a comparator for successively comparing the extracted characters with the said coded mark contained in the comparison register, the said comparator being operable to monitor the advance of the second switch in such manner that the two switches advance alternately step by step and in the same direction, and then to bring about the stoppage of the advance of the second switch when the comparator detects an identity between an extracted coded mark and the coded mark contained in the comparison register, the first switch then continuing to advance step by step and finally bringing about the resumption of the advance of the second switch, alternately step by step with the advance of the first switch, at the instant when the said comparator detects non-identity between another extracted coded mark and the coded mark contained in the comparison register.

According to the invention there is also provided an arrangement for the extraction of a word from the memory and the assembly of the remaining words on a continuous sequence of words, wherein a logical control member, called a distributor, is connected on the one hand to the comparator to receive indications resulting from the comparisons effected, and on the other hand to the pulse generator and to the second column selecting switch to receive pulses supplied by the pulse generator and to transmit them to the second selecting switch, the transmission of the pulses being stopped between the instant when the comparator detects identity between an extracted coded mark and the coded mark contained in the comparison register, and the instant when the comparator detects non-identity between another extracted coded mark and the coded mark contained in the comparison register.

The detection of the beginning of a word by means of a coded mark affords the advantage of obviating any addressing concept; because, since the memory locations are sequentially explored in a fixed order, always commencing with the first location, by means of selecting switches hereinafter called scanning networks, it is no longer necessary, for writing in or extracting a character, to effect a selection as a function of a predetermined address. This procedure makes it possible, on the one hand, to avoid using complex and costly selection circuits for effecting the registration of data in the memory or their extraction therefrom. On the other hand, it renders possible a simplification of the programming, because the programmer no longer has to know the position of the words in the memory. An instruction of the programme may then be composed of a limited number of binary components, of which a first group of binary components may serve to indicate that a word will be introduced, extracted and re-registered, or erased from the memory, while a second group of binary components will represent a coded mark permitting of identifying the said word. For example, when a word is to be erased from the memory, this erasure is ordered by an instruction in which a first group of binary components indicates that it is necessary to erase, while a second group of binary components represents, in coded form, a coded mark identical to that which, in the memory, identifies the word which must be erased. The word which is to be erased is found by seeking in the memory the coded mark which identifies this word. For this purpose, the two scanning networks are set in operation and advance alternately in the same direction so as to enable each of the words and coded marks contained in the memory to be successfully extracted from each location of the memory by means of the first selecting switch or reading network, and then to be re-introduced into the memory by means of the second selecting switch or writing network, at the location where it was previously stored. This process, which begins with the first storage location, continues with consecutive higher ordered locations until the instant when the coded mark sought is detected. The advance of the writing network is then temporarily stopped, while the reading network continues its exploration. The characters extracted are then erased until the instant when another coded mark is detected. The writing network is then rendered operative again and it advances alternately with the reading network, so that the characters are successively extracted and re-introduced into locations which have become available as a result of the erasure. In other words, when a word is to be erased from the memory, this word is extracted from the memory, character by character, without being re-registered, and all the words which were registered behind this word are shifted by a length equal to the length of the word, so that the unerased words are re-stored in the memory one after the other in a continuous sequence of characters.

Although the mode of exploration employed does not permit a rapid access to a desired word which is contained in the memory, it is possible to reduce the time necessary for the access to this word by subdivision of the memory into blocks, the capacity of each block being optionally variable, while each block may contain only words identified by a particular category of coded marks (alphabetical coded marks or numerical coder marks, for example), so that the selection of a block can be directly effected and a block thus selected may thereafter be sequentially explored. By this procedure, the memory can be made to benefit by a reduced access time.

For a better understanding of the invention and to show how it may be carried into effect, the same will now be described, by way of example, with reference to the accompanying drawings, in which:

FIGURE 2 illustrates the manner in which FIGURES 2a and 2b are assembled.

FIGURES 3 to 5 illustrate a number of elemental circuits employed in the design of some control devices.

FIGURES 3a to 5a illustrate the symbolic form in which the circuits of FIGURES 3 to 5 are adopted in FIGURES 1A, 2a and 2b.

Figure 6:
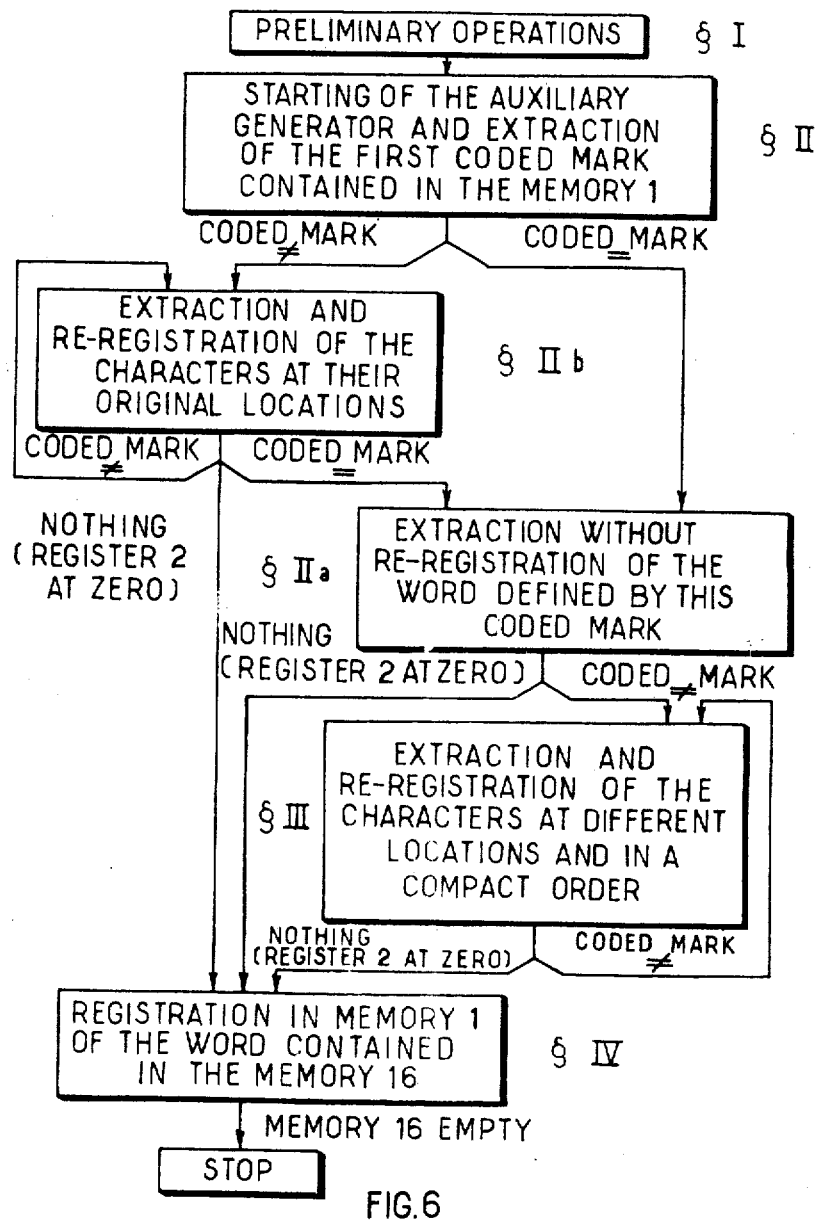

FIGURE 6 diagrammatically illustrates the process by which a word is introduced into a memory in accordance with the contents of the latter.

Figure 7:
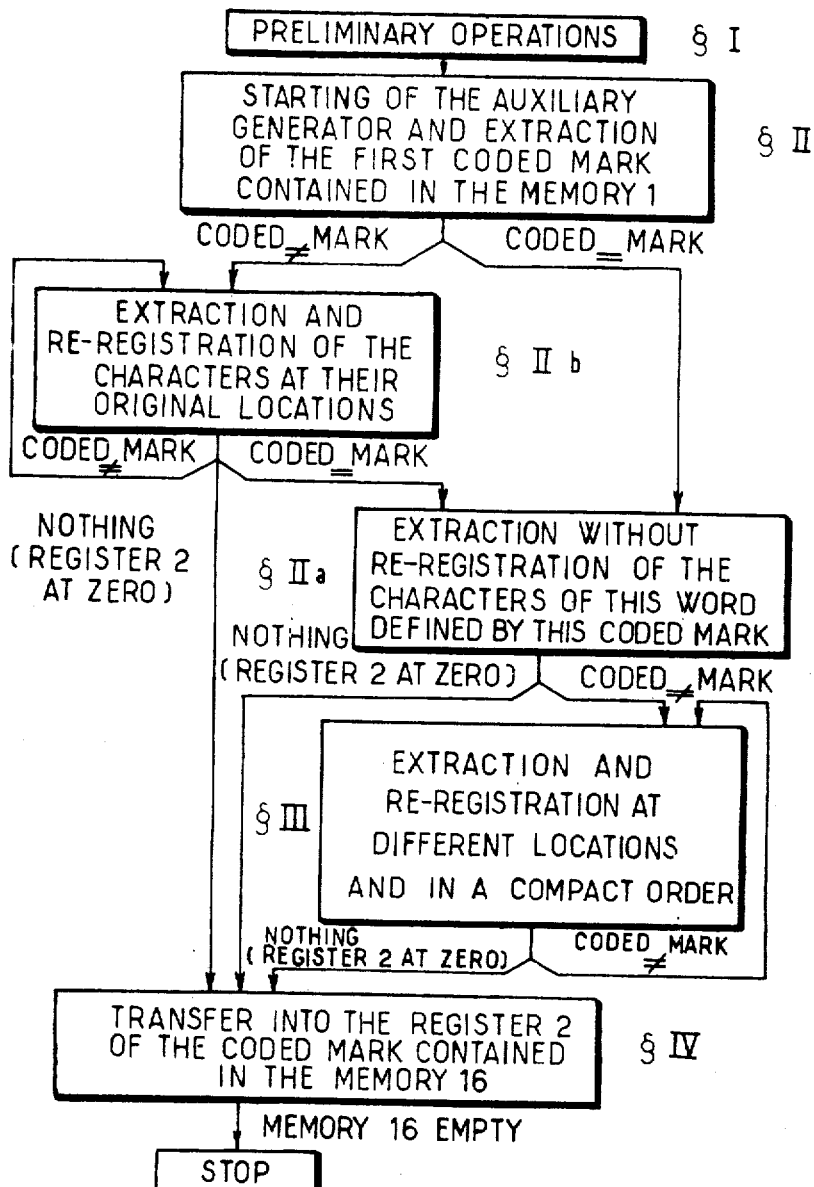

FIGURE 7 diagrammatically illustrates the process by which a word is erased in a memory in accordance with the contents of the latter.

Figure 8:
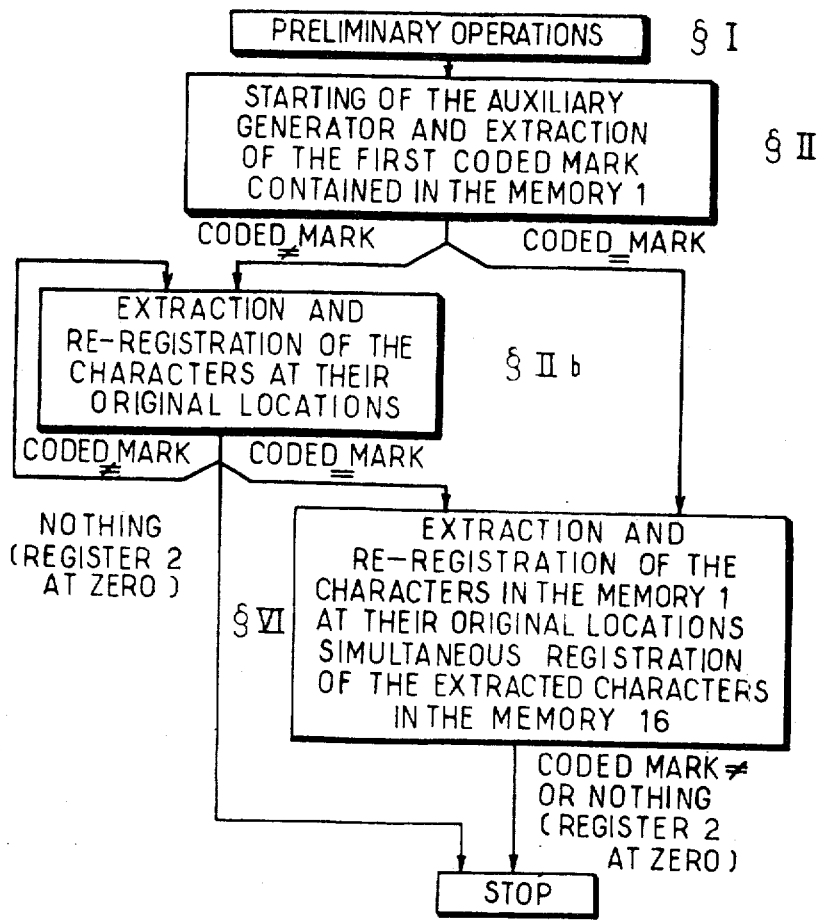

FIGURE 8 diagrammatically illustrates the process by which a word is extracted from a memory in accordance with the contents of the latter.

In the drawings accompanying the present description:

FIGURE 3 illustrates a coincidence circuit known as an AND circuit. In the circuit of FIGURE 3, which comprises two diodes connected to a common output 106 which is in turn connected through an appropriate resistor to a positive-voltage source (not shown), it is known that if positive voltages are applied to the two inputs 104 and 105, the potential of the output 106 rises and becomes positive, while if only one of the inputs is brought to a positive voltage the potential of the output 106 does not rise appreciably. This AND circuit is symbolically represented in FIGURE 3a. Although the said circuit has been shown only with two inputs in FIGURES 3 and 3a, it is to be understood that such a circuit may comprise, in accordance with circumstances, more than two diodes and consequently more than two inputs.

The circuit illustrated in FIGURE 4 is a mixing circuit which does not perform any particular logical function, but which enables positive voltages of very short duration, or positive pulses, arriving through different inputs such as 107 and 108, to be transmitted to a common output 109, thus preventing any positive pulse which arrives through one of the inputs from reacting, in turn, on the other inputs. This circuit is symbolically represented as indicated in FIGURE 4a. This circuit will not always be denoted by a reference in FIGURE 2b. In addition, it may comprise a plurality of inputs.

FIGURE 5 illustrates a control circuit possessing two inputs 110, 111 and one output 112, and intended to transmit the pulses required, in particular, for the operation of trigger circuits. One of the two inputs 110, called the pulse input and marked by a dot in FIGURE 5a to distinguish it from the other, is intended to receive a positive pulse to be transmitted. Now, it is known that when the input 111, called the control input, is brought to a positive potential, the positive pulses which arrive by way of the pulse input 110 are transmitted to the output 112, while if the control input 111 is not brought to a positive potential, the positive pulses arriving by way of the pulse input 110 are blocked. Consequently, such a control circuit may be employed in two ways. On the one hand, depending upon the state of the conductor connected to the input 111; it may either authorise or block the passage of any positive pulse arriving by way of the input 110. On the other hand, it may be used to control transfers. In this case, it being agreed that the state of a conductor brought to a positive potential represents the binary digit 1, while the state of this conductor brought to a negative potential represents the binary digit 0, it will be possible by sending a positive pulse through the input 110 to obtain, or not to obtain, at the output 112, depending upon the state of the conductor connected to the input 111, the propagation of a transmitted pulse which then corresponds to the transfer of a binary digit 1, while the blocking of this pulse corresponds to the binary digit 0.

It is to be understood that the circuits illustrated in FIGURES 3, 4 and 5 may be replaced by any equivalent circuit comprising transistors, cryotrons, magnetic cores or the like.

*Memory and scanning networks*

Figure 2A:
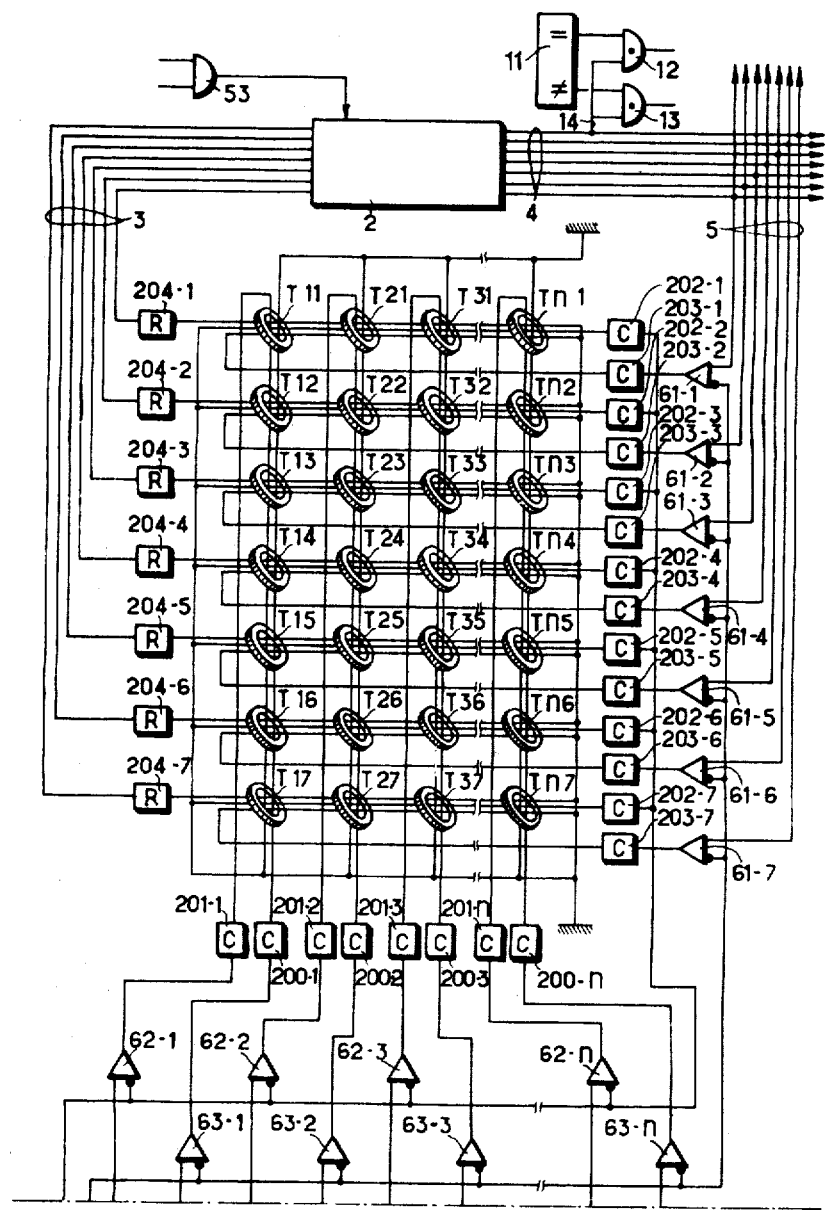
FIGURE 2a illustrates in even more detailed form the construction of certain members of a memory.

FIGURE 2a shows the basic diagram of a memory comprising a matrix of storage elements which will be described by way of example to enable the invention to be understood. In the example described, this memory comprises toroidal magnetic cores, but it is to be understood that the adoption of this type of memory is not exclusive and may be replaced by any other type of matrix memory. In a manner known per se, the cores of the store are adapted to be brought into either of two states of magnetisation conventionally called state "0" and state "1." In the example under consideration, the magnetic cores are disposed, in accordance with a two-dimensional construction, in such manner as to constitute rows and columns, each column consisting of a set of 7 magnetic cores which serve to record, in accordance with a well known technique, the coded representation of a character. Thus, a set of 7 cores T11, T12, T13, T14, T15, T16 and T17 is reserved for recording in this store the coded representation of a first character. Another set of seven cores T21, T22, T23, T24, T25, T26 and T27 is used to record a second character in the store. The figure illustrates, with obvious notations, the first three columns of seven cores by means of which the first three characters of the stored data can be recorded in the memory. For the sake of simplicity, the succeeding columns have not been shown, except the last, but it is obvious that the number of such columns is optional a priori and will be determined in accordance with the number of data to be stored. In the following text, it will be assumed that the character capacity of this memory is sufficient to ensure good operation of the device. All the cores of one column are traversed, on the one hand, by a first series of conductors connected to calibrating members 200-1, 200-2, 200-3, . . . 200-n, and on the other hand by a second series of conductors connected to calibrating members 201-1, 201-2, 201-3, . . . 201-n. All the cores of one line are traversed, on the one hand, by a series of conductors connected to calibrating members 202-1, 202-2, 202-3, . . . 202-7, and on the other hand by another series of conductors connected to calibrating members 203-1, 203-2, 203-3, . . . 203-7. Finally, all the cores of one line are traversed by a last series of conductors connected to regenerating members 204-1, 204-2, 204-3, . . . 204-7. All the calibrating members have the object of acting on the strength of the currents which flow through them, so that the strength of the current delivered by each of them is established at a value equal to one half of the value necessary for modifying in known manner the magnetic state of a core. The cores of the memory being assumed to be initially in the state 0, the change to the state "1" of a particular core, such as the core T24 for example, will be effected by simultaneously sending a pulse along each of the conductors, in the row and the column passing through the said core, by means of the calibrating members 200-2 and 203-4. If, with this core then in the state "1," a pulse is simultaneously sent by the calibrating members 201-2 and 202-4, the said core returns to the state "0," while a pulse produced by the change of state of the core is transmitted to the regenerating member 204-4. The well-known methods of utilising this memory will not be further dwelt upon. It will merely be stated that the function of the regenerating members is to act on the amplitude of the pulses which reach them and which are produced at the time of the change of the cores from the state "1" to the state "0," so that the pulses delivered by these regenerating members may be utilised in an appropriate manner by trigger circuits.

The code which has been adopted in the present invention is a code having six binary positions, by means of which it is possible to encode up to 64 different characters. With the code employed, which constitutes only an example and is not intended to limit the invention, each character (letter, digit or symbol of variable form) requires for its representation a set of six binary digits.

According to the invention, the data are introduced into the memory in the form of words, each word consisting of one or more characters. These words are introduced into the memory one after the other and are separated from one another by special characters called coded marks, the function and constitution of which will be defined in the following. According to the invention, each word introduced into the memory is preceded by a special character, or coded mark, of which the function is, on the one hand, to separate this word from the preceding one, and on the other hand to serve for locating this word in the store. This assumes, of course, that each of the words introduced into the memory is accompanied by a different coded mark, so that two identical coded marks cannot be simultaneously contained in the memory. Each coded mark consists of a coded combination of six binary digits to which has been added an additonal binary digit 1 to distinguish it from the analogous combination of six binary digits corresponding to the coding of the normal characters. The coded marks will therefore each require for their representation a set of seven binary digits. There may thus be available 64 different coded marks, but it is to be understood that, in accordance with requirements, the number of coded marks could be increased by choosing a code such that each coded mark requires for its representation a set of more than seven binary digits. In the example described, in which up to 64 coded marks may be used, each coded mark may be stored in any location in the memory under consideration, each location corresponding to a column of 7 magnetic cores.

The presence of a binary digit 1 stored in any location in the memory and in one of the cores T17, T27, T37 . . ., T*n*7, will indicate that the character registered in this location is a coded mark, while the absence of this binary digit 1 will indicate, on the contrary, that this character is an ordinary character forming part of a word.

The characters and the coded marks being registered in the memory in accordance with the configuration just described, the locations in the memory will be successively selected by means of a first selecting switch called a reading network, so as to extract successively the characters or coded marks contained in thes locations. The extraction will be effected in known manner by simultaneously sending a pulse to all the calibrating members 202–1 to 202–7 and to the calibrating members 201–1 to 201–*n* corresponding to the chosen location. The character or coded mark thus extracted is transferred by means of a group of 7 conductors 3 to an auxiliary register 2 comprising 7 storage positions, each of the seven binary digits of the coded combination of the said character or coded mark being stored, respectively, in one of these seven storage positions. The character or coded mark stored in the auxiliary register 2 may thereafter be extracted from this register by means of a group of conductors 4 which, as is shown in FIGURE 2*a*, is divided into a number of groups of conductors. One of these groups of conductors 5 is used to effect the introduction into the memory of the character or coded mark contained in the register 2.

This storage is effected in known manner by simultaneously sending a pulse to one of the calibrating members 200–1 to 200–*n* corresponding to a chosen location, and to control circuits 61–1, 61–2, 61–3, . . ., 67–7. In accordance with the coded combination of the character or coded mark to be stored, these control circuits do or do not transmit the pulse which they receive, to the calibrating members 203–1 to 203–7. In accordance with the invention, the successive locations in the memory are successively exploded in order to register therein characters or coded marks, by means of a second selecting switch, called the writing network, which succeessively sends a pulse to only one of the calibrating members 200–1 to 200–*n*, each of which corresponds to a chosen location.

In FIGURE 2*a*, two AND circuits 12 and 13 have been shown. These circuits are connected through a conductor 14 to that position of the auxiliary register 2, or the additional position, which serves to store the binary digit 1 characterising a coded mark. If the register 2 contains a coded mark, this position contains a binary digit 1 and the conductor 14 is brought to a positive potential. If, on the other hand, the register 2 contains a normal character, this position contains a binary digit 0 and the conductor 14 is not brought to a positive potential. It will be recalled that each coded mark requires for its representation a set of seven binary digits, while each normal character requires only six binary digits, so that the effect of the presence of a character is the same as if the additional position contained only the binary digit 0.

*Reading network and writing network*

Figure 2B:
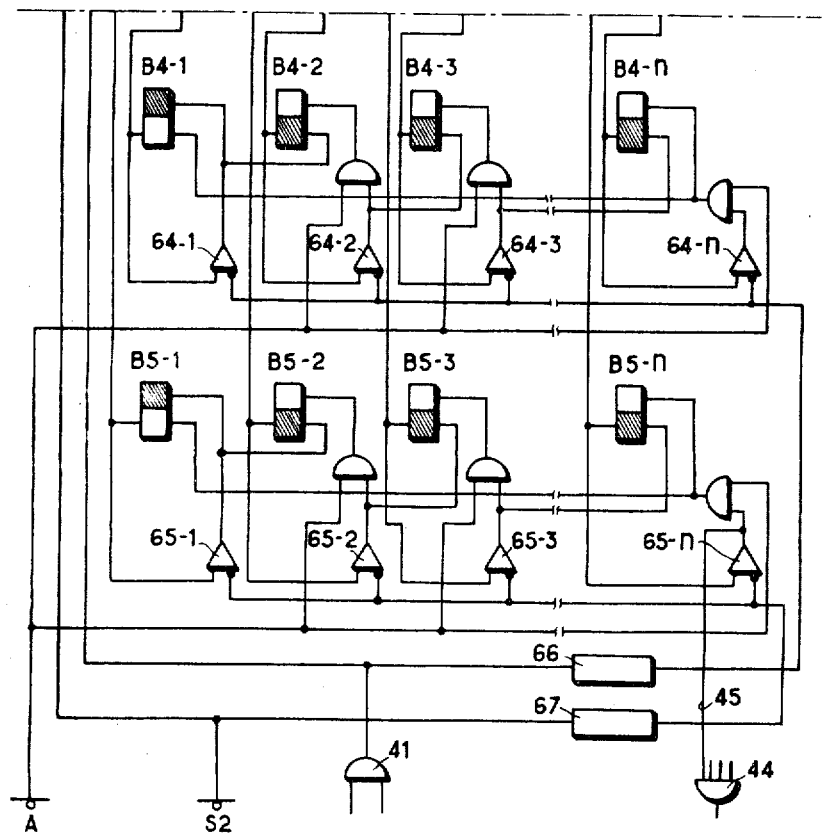
FIGURE 2b illustrates a scanning network construction.
Figure 2:
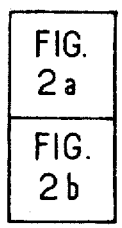

FIGURE 2*b* shows the basic diagram of the scanning networks employed in the example described. These networks consists, in the present case, of trigger circuits, but it is obvious that any equivalent device, such as a distributing switch comprising magnetic cores and advancing step by step, for example, could be used. A series of trigger circuits B4–1 to B4–*n* constitutes the writing network. Another series of trigger circuits B5–1 to B5–*n* constitutes the reading network. Each network comprises a number of trigger circuits equal to the number of locations in the memory which they have to explore. For the sake of clarity of the diagram and its operation, one half of the rectangle representing each trigger circuit has been hatched in conventional manner to indicate the state of the said trigger circuit. FIGURE 2*b* represents the trigger circuits B4–1 and B5–1 in a state taken conventionally as the state "1," while the other trigger circuits of the reading and writing networks are represented in a state taken conventionally as the state "0." A series of control circuits 64–1 to 64–*n* has the object of ensuring the step-by-step advance of the writing network, any pulse arriving in parallel at these circuits permitting of advancing this network by one step or, what amounts to the same thing, of changing to the state "0" that one of the trigger circuits which is in the state "1" and simultaneously changing the succeeding trigger circuit to the state "1." A series of control circuits 65–1 to 65–*n* permits of similarly advancing the reading network step-by-step. The pulses for advancing the reading network are emitted by an output S2, which will hereinafter be referred to, and thereafter transmitted through a delay member 67 to the control circuits 65–1 to 65–*n*. The pulses for advancing the writing network are emitted by the output of a mixing circuit 41, and then transmitted through a delay member 66 to the control circuits 64–1 to 64–*n*. Each pulse emitted by the output S2 arrives simultaneously at the delay member 67, at the calibrating members 202–1 to 202–7 and, through control circuits 62–1 to 62–*n* (illustrated in FIGURE 2*a* and so conditioned that only one of them is conductive), at one of the calibrating members 201–1 to 201–*n*. Each pulse emitted by the output of the mixing circuit 41 arrives simultaneously at the delay member 66, at the control circuits 61–1 to 61–7 and, through control circuits 63–1 to 63–*n* (shown in FIGURE 2*a* and so conditioned that only one of them is conductive), at one of the calibrating members 200–1 to 200–*n*. FIGURES 2*a* and 2*b*, when assembled, show that the outputs of the trigger circuits B4–1 to B4–*n* are connected to the control circuits 63–1 to 63–*n* respectively, so as to enable only one of these circuits to effect the transmission of a pulse emitted by the output of the mixing circuit 41. Likewise, the outputs of the trigger circuits B5–1 to B5–*n* are connected to the control circuits 62–1 to 62–*n* respectively, so as to enable only one of these circuits to effect the transmission of a pulse emitted by the output S2. Of course, the control circuits which are thus rendered conductive correspond to the two trigger circuits which, among the trigger circuits constituting the scanning networks, are in the state "1." A pulse emitted by the output S2 thus permits of extracting from the memory the character or coded mark which is situated at a predetermined location in the memory, due to the state of the trigger circuits B5–1 to B5–*n*. Immediately after the extraction, this pulse, appropriately delayed by the delay member 67, advances the reading network by one step, so as to enable a succeeding pulse emitted by the output S2 to extract the character or coded mark situated in the succeeding location. The writing network operates similarly and its operation will not be further described. It will simply be noted that the writing network advances in the same direction as the reading network. FIGURE 2*b* illustrates the state assumed by the trigger circuits when the two networks are in the initial or first column position. The resetting of the networks to the initial position will be effected, in the example described, with the aid of a pulse sent by an output A, which will hereinafter be referred to. FIGURE 2*b* also shows a conductor 45 which enables a pulse transmitted by the control circuit 65–*n*, when the reading network has completed its advance, to be transmitted to a mixing circuit 44. This pulse determines the instant when all the locations in the memory have been explored by the reading network and it may be used for multiple purposes, for example for producing the stopping of the devices constituting the invention. In the example chosen, this pulse is transmitted to the mixing circuit 44.

General description of the devices

Figure 1:
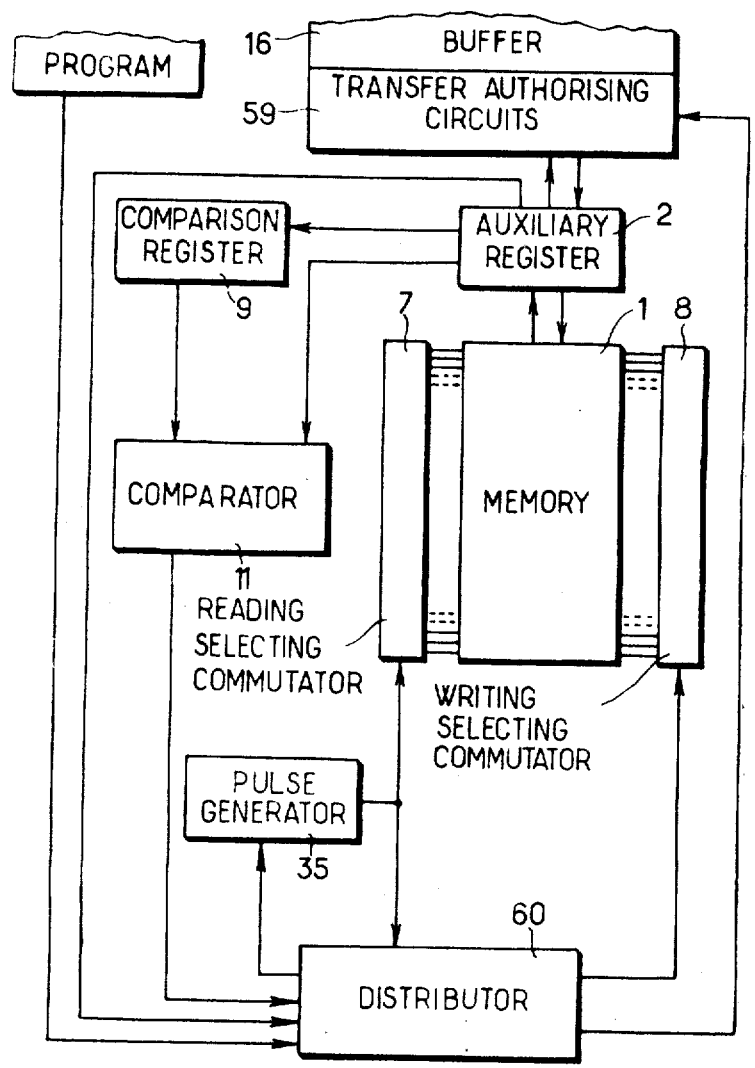
FIGURE 1 shows diagrammatically by way of example a set of assembled devices for the application of the invention.

In FIGURE 1, there will be seen:

at 1, the memory comprising a matrix of storage elements
at 2, the auxiliary register
at 7, the reading network
at 8, the writing network
at 9, the comparison register
at 11, the comparator
at 16, the buffer memory partly shown
at 35, the pulse generator
at 59, the character transfer authorising circuits
at 60, the distributor.

Figure 1A:
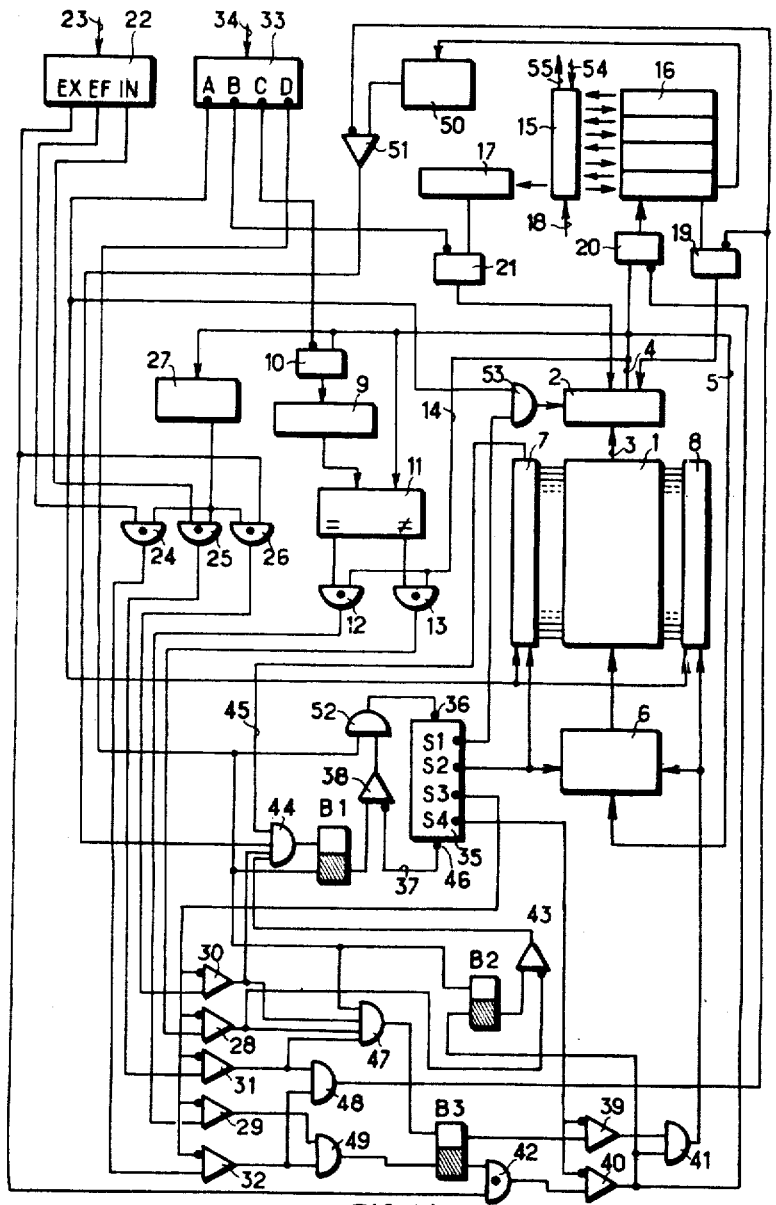
FIGURE 1A shows in greater detail a set of devices with their connections, arranged for the application of the invention.

The essential devices of the invention and their mutual connections are indicated in FIGURE 1, but the operation of this assembly of devices, in a data-processing machine, is illustrated in greater detail in FIGURE 1A, in which the preceding devices will be found.

FIGURE 1A illustrates by way of example and in greater detail a system constructed and employed for the application of the invention. In this system, a matrix memory 1, such as that illustrated in FIGURE 2a, for example, serves to contain data registered in the form of words, each word being preceded by a coded mark which serves to locate it in the memory and which, in addition, serves to separate it from the preceding one. Each of the characters and coded marks thus contained in the memory 1 can be extracted from this memory and transferred into an auxiliary register 2 by means of a group of conductors 3, by the use of a reading network 7. A character or coded mark may be transferred from the auxiliary register 2 to the memory in order to be stored in the latter, by means of groups of conductors 4 and 5, by the use of a writing network 8. For the details of the construction of the memory 1, of the reading network 7, of the writing network 8 and of the connection existing between the various parts of this assembly as also between the memory 1 and the register 2, reference will be made to FIGURES 2a and 2b. The calibrating members 202–1 to 202–7, 203–1 to 203–7 and the control circuits 61–1 to 61–7, illustrated in FIGURE 2a, form a group of circuits illustrated in FIGURE 1A and called reading and writing circuits 6. The character or coded mark contained in the register 2 may be transferred into and stored in a seven-position register 9, called a comparison register, by the use of a control member 10, which will hereinafter be described. The comparison register 9 consists, in the described example of seven trigger circuits, each of which serves to store one of the seven binary digits constituting the coded combination of a character or of a coded mark. These trigger circuits, which have two inputs and two outputs, are of a type which is so well known as to require no description. However, it will be noted that each trigger circuit comprises two inputs, one serving for registering a binary digit, and the other serving to register the complement to this digit, and two outputs complementary to one another. The seven trigger circuits constituting the register 9 receive the binary digits (and their complements), which they must store, by way of their two inputs, whereby any return to zero of the register 9 before any further storage is avoided. It will also be noted that, in order to simplify the drawing of FIGURE 1A, the groups of conductors, such as 4, which serve to transfer groups of binary digits (as also their complements) corresponding to the coded combinations of the characters or of the coded marks, have been represented by single conductors. Likewise, for obvious reasons of simplification, the conductors serving for the transfer of the complements to these binary digits have not been shown in any of the figures.

The register 2 consists, in the described example, of seven trigger circuits identical to the trigger circuits constituting the register 9, but which receive the binary digits which they are to store, through only one of their two inputs. In this case, the other input is used to effect the return to zero before any further registration. All the trigger circuits constituting the register 2 will be simultaneously returned to zero by the dispatch of a pulse emitted by the output of a mixing circuit 53 (illustrated in FIGURES 1A and 2a).

A comparator 11 serves to compare at any instant the coded mark contained in register 9 with a character or another coded mark contained in register 2. This comparator is of a known type and for this reason it will not be described. It comprises two outputs marked $=$ and $\neq$, which will be connected, one to the AND circuit 12 and the other to the AND circuit 13, respectively. It will be recalled, as indicated also in FIGURE 2a, that these AND circuits are connected to the seventh binary position of the auxiliary register 2 through the conductor 14. The output $=$ of the comparator is at a positive voltage only when the registers 2 and 9 both contain the same coded mark. The output $\neq$ of the comparator is at a positive voltage each time the contents of the register 2 differ from those of the register 9. As has previously been stated, the conductor 14 is at a positive voltage each time the register 2 contains a coded mark. Consequently, the output of the AND circuit 12 will be brought to a positive potential each time the registers 2 and 9 simultaneously contain the same coded mark, while the output of the AND circuit 13 will be brought to a positive potential each time the register 9 contains a coded mark and the register 2 contains a different coded mark. The output of the AND circuit 12 is connected to a control circuit 29, while that of the AND circuit 13 is connected to a control circuit 28.

The data contained in the memory 1 emanate from peripheral elements, such as card readers, an encoding keyboard, tape readers, or the like, or are intended for peripheral elements such as card punchers, printers, visual display devices or the like. These data emanating from or preceeding to the aforesaid peripheral elements, which are not shown in the figures, pass through a buffer memory 16, whereby it is possible to obviate all the disadvantages arising from the fact that the peripheral elements operate at a speed which may be different from the speed at which the data are introduced into or extracted from the memory 1. It will be assumed that this memory 16 is of known type and that its character capacity is sufficient to ensure good operation of the machine. Thus, it will be assumed that this memory has been designed a priori to contain a word, which word consists of a number of characters less than or equal to a predetermined number. FIGURE 1A illustrates a memory 16 having four locations, each location being designed to contain a character, but it is to be understood that the number of locations may in fact be higher and may vary from several units to several tens, etc. Since the memory 16 is designed to contain a word, the exchanges of characters between the memory 1 and the memory 16, or vice versa, will take place sequentially, the characters which constitute a word being successively transferred one after the other from one of these memories to the other, or vice versa, through the register 2. In order to give a clear idea and by way of indication, it will be assumed that the memory 16 is a shift memory, each of the characters being progressively transferred from one location in this memory to the next location, at each extraction or introduction of a character. The transfers of the characters from the memory 16 to the register 2 are determined by a control member 19 which, when it receives a pulse transmitted through the output of a mixing circuit 48, brings about the transfer of a character from the memory 16 to the register 2. The transfers of characters from the register 2 to the memory 16 are determined by a control member 20 which, when it receives a pulse transmitted by a control circuit 40, brings about the transfer of a character contained in the register 2 to the memory 16. The control members 19 and 20 constitute a part of the transfer authorising circuits 59 illustrated in FIGURE 1. Switching means 15 of known type permit a correct distribution of the characters within the memory 16 when these characters emanate from the peripheral elements, or effect a correct extraction of these characters if the latter are intended for the peripheral elements. An arrow 18 symbolically represents a control for setting the aforesaid switching means in operation. This control emanates from machine control elements which have not been shown because they do not form part of the invention. Two arrows 54 and 55 symbolically represent an input and an output through which the date arrive from or proceed towards the peripheral elements. When a word, preceded by a coded mark, proceeds from a peripheral element towards the memory 16, the switching means 15 are set in operation so as to ensure that this word preceded by its coded mark is stored in the memory 16 and at the same time to ensure that this coded mark is introduced into a register 17. The coded mark thus contained in the register 17 may thereafter be transferred into the auxiliary register 2 by the operation of a control member 21. Likewise, the coded mark and the characters contained in the memory 16 may be successively transferred into the register 2 as previously stated. When all these characters have been transferred, an indicating member 50, set in operation each time the memory 16 no longer contains any character or coded mark, renders a control circuit 51 conductive. The said member 50 is a device for indicating the state of the memory, hereinafter called the state indicator of the buffer memory, of known type, and indicates the presence or absence of data in the memory 16. The assembly of devices illustrated in FIGURE 1A permits of introducing a word into the memory 1 in locations following those already containing characters. It also permits of extracting a particular word from the memory 1 or erasing it therein. These three operations, called introduction, extraction and erasure, respectively, will be carried out, as will hereinafter be described, under control of particular instructions forming part of a programme. These particular instructions are applied, in coded form, to an instruction decoder 22 by an input symbolically represented by an arrow 23. This instruction decoder 22 comprises three outputs marked EX, EF, IN. According to the instruction which has been decoded, only one of these three outputs is brought to a positive voltage. Thus, if the instruction which has been decoded by the instruction decoder 22 relates to the operation of introduction, only the output IN is brought to a positive potential, while if this instruction relates to the operation of extraction, only the output EX is brought to a positive potential. Likewise only the output EF is brought to a positive potential if the instruction which has been decoded relates to an operation of erasure. The output EX is connected to two AND circuits 26 and 42, while the two outputs EF and IN are connected to the two AND circuits 24 and 25 respectively in the manner indicated in the figure.

An indicating member 27, called the state indicator of the auxiliary register and of similar construction to the member 50, is intended to indicate the availability of the register 2. When the register 2 contains neither character nor coded mark, the member 27 brings its output to a positive voltage. The output of the indicator 27 is connected to the three AND circuits 24, 25, 26. The output of the AND circuit 24 is connected to a control circuit 32, that of the AND circuit 25 is connected to a control circuit 31 and finally that of the AND circuit 26 is connected to a control circuit 30.

There will now be briefly described the control members 10, 19, 20 and 21. Each of these control members, with the exception of the control member 10, consists of seven control circuits of the type described and illustrated in FIGURE 5a. The seven control circuits constituting a control member are arranged in a manner similar to that illustrated in FIGURE 2a, in which the seven control circuits 61-1 to 61-7 simultaneously receive a pulse, but in FIGURE 1A the seven conductors connected to these circuits have been represented by a single conductor.

Similarly, the control member 10 consists of fourteen control circuits, seven of which serve for the transmission of the binary components of the coded combination of a character or coded mark and may transmit a pulse to one of the two inputs of each trigger circuit of the register 9, while the other seven serve for the transmission of the complementary values to these binary components and may transmit a pulse to the other input of each of the trigger circuits of the register 9. Thus, in the storage of a character or coded mark in the register 9, each of the trigger circuits of this register always receives a pulse through either one of its two inputs.

The assembly of devices illustrated in FIGURE 1A is set in operation by means of pulses sent by a main pulse generator 33 and by an auxiliary pulse generator 35, which have the function of coordinating all the operations which involve, according to the circumstances, the introduction, extraction or erasure of words in the memory 1. These generators consist, for example, of delay lines having intermediate taps, with or without pulse regenerators, these lines thus delivering pulses at particular instants depending upon the operations to be accomplished. In the example under consideration, the delay line constituting the main generator 33 comprises at one of its ends an echo suppressing device of known type, whereby it is possible to avoid reflection of the pulses at the end of the line, while the other end constitutes an input 34 through which there arrives a starting pulse which is thereafter propagated in the line. The main generator 33 comprises four intermediate taps or outputs, marked A, B, C and D which, when the line has received a starting pulse, each supply a pulse at predetermined instants.

The auxiliary generator 35 consists of a similar delay line, one of the ends of which, however, constitutes an input 36 connected to the output of a mixing circuit 52, while the other end constitutes an output 46 connected to the input of a control circuit 38 through a conductor 37. When the control circuit 38 connected to the output of a trigger circuit B1 is rendered conductive, depending upon the state of this trigger circuit B1, this circuit transmits a pulse, called an output pulse in the following text, which comes from the output 46 of the auxiliary generator 35 and which is applied to the mixing circuit 52, which renders possible a looping. The auxiliary generator 35 comprises four intermediate taps or outputs marked S1, S2, S3 and S4 each of which supplies a pulse at predetermined instants of a memory cycle time.

FIGURE 1A again shows two trigger circuits B2 and B2 which enable control circuits 43, 39 and 40, connected to the outputs of the said trigger circuits, to be rendered conductive or non-conductive. The three trigger circuits B1, B2 and B3 have been shown, with the convention adopted, in the state "0" in FIGURE 1A. Under these conditions, in accordance with the arrangement indicated in FIGURE 1A, the control circuit 38 is non-conductive, as also are the control circuits 40 and 43, while the control circuit 39 is conductive. The trigger circuit B1 changes to the state "0," or remains in this state if it was already so, each time it receives a pulse transmitted through the output of a mixing circuit 44 (also illustrated in FIGURE 2b).

FIGURE 1A further illustrates the mixing circuit 41 (also illustrated in FIGURE 2b), which transmits all the pulses which it receives from either of the control circuits 39 and 40. Other mixing circuits 47 to 49 illustrated and arranged as indicated in FIGURE 1A are intended to transmit the pulse coming from the control circuits 28 to 32.

It may be considered that the assembly comprising the AND circuits 12, 13, 24, 25, 26 and 42, the control circuits 28, 29, 30, 31, 32, 39, 40 and 43, the trigger circuits B2 and B3 and the mixing circuits 41, 47, 48 and 49, connected together in the manner indicated in FIG- URE 1A, constitutes the distributor 60 illustrated in FIGURE 1.

Likewise, the assembly comprising the control circuits 38 and 51, the mixer 44 and the trigger circuit B1, which are connected together as indicated in FIGURE 1A, constitutes means, called means for stopping the pulse generator 35 and intended to stop this generator by blocking the pulses emitted by the output 46.

Three examples of operation of the assembly illustrated in FIGURE 1A will now be described for a better understanding of the invention.

These examples relate to the introduction, erasure and extraction of a word in the memory 1 respectively.

In order that the sequency of operations which are now to be described may be more readily understood, reference will be made to FIGURE 1A and to one of FIGURES 6, 7 and 8, the latter three figures illustrating, respectively, a flow chart for introduction, erasure or extraction of a word in the memory, according to the circumstances which may exist, the essential operations which correspond to each case being summarised, in abridged form, in a rectangle accompanied by a reference, and the more detailed operations corresponding to each case being described in the following text in a paragraph which bears the same reference as is indicated on the drawings.

FIGURE 6 concerns the introdutcion, FIGURE 7 concerns the erasure and FIGURE 8 concerns the extraction of a word in the memory 1, this extraction being effected with re-registration of the word in the memory 1 and, simultaneously, transfer of the said word to the memory 16.

A—Introduction of a word into the memory

It will be considered that a word intended to be stored in the memory 1 has been registered in the memory 16 by the operation of the switching circuits 15 and that this word has been given a coded mark which is also contained in the memory 16, in a first location in the said memory, so that it can be transferred before the characters constituting the word. This coded mark has in addition been registered in the register 17. The instruction relating to the operation of introduction has been decoded by the instruction decoded 22 and the output IN only is brought to a positive potential. In reading the following, it will be useful to refer to FIGURES 1A and 6.

I—Preliminary operations

The following operations, called preliminary operations, are triggered by a starting pulse applied to the main generator 33 through the input 34. A pulse is then emitted by the output A of this generator. The drawing contained in FIGURE 1A shows that this pulse is applied on the one hand to the mixing circuit 53, which transmits it to the auxiliary register 2 and effects the return-to-zero of the latter, and on the other hand to the two scanning networks 7 and 8, so that these two networks can be returned into the starting position. A pulse is thereafter emitted by the output B of the main generator 33, setting in operation the control member 21, whereby the transfer of the coded mark contained in the register 17 to the register 2 is brought about. The output C of the main generator 33 then emits a pulse which sets in operation the control member 10 and produces the transfer of the coded mark contained in the register 2 to the comparison register 9. At the end of these operations, the registers 17, 2 and 9 and the first location of the memory 16 contain the same coded mark, this coded mark being that which has been allocated to the word which is to be stored in the memory 1 and which, for the moment, is stored in the memory 16.

The output D of the main generator 33 then emits a pulse which is directed to the mixing circuits 52 and 47 and to the trigger circuits B1 and B2. Under the effect of this pulse, the trigger circuit B1 changes to the state "1" and the trigger B2 remains in the state "0" (or changes to the state "0" if it was previously in the state "1"). The said pùlse is transmitted by the mixing circuit 47 to the trigger circuit B3, which remains in the state "0" or changes to the state "0" if it was previously in the state "1". Under these conditions, the control circuits 38 and 39 become conductive, while the control circuit 43 is non-conductive. The aforesaid pulse which arrives at the mixing circuit 52 is transmitted to the input 36 of the auxiliary generator 35 and thus sets it in operation.

All the operations just described are called preliminary operations and are repeated before any introduction, extraction or erasure of a word in the memory 1.

II—Operations performed after the starting of the auxiliary generator

The auxiliary generator 35, started by the pulse applied to its input 36, then emits through the output S1 a pulse which is transmitted through the mixing circuit 53 and returns the register 2 to zero. A pulse emitted through the output S2 of the said generator and applied to the reading and writing circuits 6 and to the reading network 7 then renders possible the extraction of the coded mark situated in the first location in the memory 1. This coded mark is then transferred to the register 2.

The comparator 11 then compares the contents of the registers 2 and 9. As has previously been explained, if the register 2 contains a coded mark different from that contained in the register 9, only the output of the AND circuit 13 is brought to a positive voltage and consequently the circuit 28 is rendered conductive. If, on the other hand, the register 2 contains a coded mark identical to that contained in the register 9, only the output of the AND circuit 12 is brought to a positive voltage and consequently the circuit 29 is rendered conductive. Finally, when later, the register 2 contains a character, none of the outputs of the AND circuits 12 and 13 is brought to a positive voltage and consequently the circuits 28 and 29 are not conductive.

A pulse emitted through the output 83 of the auxiliary generator 35 and applied to the control circuits 28 to 32 will be either transmitted by only one of these circuits or blocked by the latter, depending upon whether the register 2 will have remained at zero or whether it will contain, at the time of the sending of the said pulse, a character, a coded mark identical to that contained in the register 9 or a coded mark different from that contained in the register 9.

Since the register 2 contains a coded mark after the first extraction from the memory 1, two cases indicated in FIGURE 6 may then arise, depending upon whether this coded mark is identical to or different from that contained in the register 9 and the operations which result therefrom will be separately described in the following paragraphs IIa and IIb.

IIa—The register 2 contains a coded mark identical to that contained in the register 9

In this case, the output of the AND circuit 12 is brought to a positive potential, whereby the control circuit 29 is rendered conductive. The pulse emitted by the output S3 is then transmitted through the circuits 29 and 49 to the trigger circuit B3, which thus changes to the state "1." The output of the AND circuit 42 is not brought to a positive potential owing to the fact that the output EX of the instruction decoder 22 is not at a positive potential. The control circuits 39 and 40 are then non-conductive and a pulse emitted by the output S4 is then blocked by these circuits.

An output pulse emitted by the output 46 of the auxiliary generator 35 is then applied by means of the conductor 37 to the control circuit 38. Owing to the fact that the control circuit 38 is conductive, this pulse is transmitted by the said circuit 38 and by the mixing circuit 52 and is applied to the input 36 of the auxiliary generator 35. The looping having been effected, a new series of pulses will be successively emitted by the outputs S1, S2, S3 and S4 of the auxiliary generator 35.

A pulse emitted by S1 returns the register 2 to zero, which has the effect of erasing the coded mark which it contained. A pulse emitted by S2 permits the extraction from the memory 1 of the first character of the word located by the coded mark which has just been erased. This first character is contained in the register 2 after extraction. Since none of the outputs of the AND circuits 12, 13, 24, 25 and 26 is brought to a positive voltage, none of the control circuits 28 to 32 is rendered conductive and the pulse emitted by S3 is consequently blocked. The trigger circuit B3 remains in the state "1" and consequently, since the control circuits 39 and 40 are not conductive, the pulse emitted by S4 is blocked by these circuits.

It will be noted that, in the course of these operations, only the reading network advances, while the advance of the writing network, which receives no pulse, is temporarily blocked. It will also be noted that all the characters of the word located by the coded mark which has been erased are successively extracted from the memory 1 and then erased in the register 2 without having been re-registered in the memory 1. This procedure prevents two words located by the same coded mark from being simultaneously contained in the memory 1.

When the last character of the word undergoing erasure has been erased by a pulse emitted by S1 at the resetting of the register 2 to zero, a pulse emitted by S2 produces a further extraction from the memory 1 and two cases may then arise, as is shown in FIGURE 6. In one of these cases, the register 2 contains a coded mark different from that contained in the register 9. In the other, the register 2 has remained at zero. These two cases will be referred to again and examined hereinafter in paragraphs III and IV.

*IIb—The register 2 contains a coded mark different from that contained in the register 9*

In this case, the output of the AND circuit 13 is brought to a positive potential, whereby the control circuit 28 is rendered conductive. A pulse emitted by S3 and successively transmitted by the control circuit 28 and the mixing circuit 47 positions the trigger circuit B3 in the state "0," on the one hand, and is blocked by the control circuit 43 owing to the fact that the trigger circuit B2 is in the state "0" on the other hand.

A pulse emitted by the output S4 of the auxiliary generator and applied to the two control circuits 39 and 40 is transmitted only by the control circuit 39 owing to the fact that the trigger circuit B3 is in the state "0." When then transmitted by the mixing circuit 41, this pulse is applied to the reading and writing circuits 6 and to the writing network 8. The coded mark contained in the register 2 is then re-introduced into the memory 1 at the location which it previously occupied, while the writing network advances by one step.

Owing to the fact that the control circuit 38 is conductive, the output pulse of the auxiliary generator 35 is transmitted by this control circuit and by the mixing circuit 52. The looping having been effected, a further series of pulses will be successively emitted by the outputs S1, S2, S3 and S4. When the register 2 has been returned to zero by a pulse emitted by S1, a pulse emitted by S2 will permit the extraction of the first character of the word located by the coded mark which has just been reintroduced into the memory 1. Since the register 2 then contains a character, none of the control circuits 28 to 32 is conductive. A pulse emitted by S3 is therefore blocked by these circuits. Consequently, the trigger circuits do not change their state and the control circuit 39 remains conductive for the pulse emitted by S4. This pulse emitted by S4 enables the character contained in the register 2 to be re-introduced into the memory 1 at the location in which it was previously registered.

The operation continuing in the manner just indicated, it will be seen that all the characters and coded marks which are thus successively extracted from the memory are re-introduced into this memory at the locations which they previously occupied and this process continues until the instant when, after extraction from the memory 1, the register 2 remains at zero or contains a coded mark identical to that contained in the register 9. From this instant, two procedures each corresponding to one of these two causes may be initiated. If the register 2 contains a coded mark indentical to that contained in the register 9, the operations which proceed are those which have been described in paragraph IIa. If the register 2 has remained at zero, the operations which proceed are those which will hereinafter be described in paragraph IV.

*III—After erasure of a word in the memory, the register 2 contains, following a further extraction, a different coded mark*

It has been seen, as has been explained in paragraph IIa, that if the memory 1 contained a word located by a coded mark identical to that contained in the register 9, this word, and its coded mark, were extracted from the memory, character by character, but were not re-introduced into this memory and that, by successive returns to zero of the register 2, it was thereafter erased. In the course of the extraction of one word, the reading network 7 has continued to advance, while the writing network has temporarily stopped.

This process continues until the instant when, following an extraction performed as a result of a pulse emitted by S2, the register 2 contains a coded mark different from that contained in the register 9. The output of the AND circuit 13 is then brought to a positive potential, whereby the control circuit 28 is rendered conductive. A pulse emitted by S3 and successively transmitted by the control circuit 28 and the mixing circuit 47 positions the trigger circuit B3 in the state "0" on the one hand, and is blocked by the control circuit 43, on the other hand, owing to the fact that the trigger circuit B2 is in the state "0". The writing network 8 is then brought into such a condition as to be able to advance again since the control circuit 39 is again rendered conductive. A pulse emitted by S4 and applied to the two control circuits 39 and 40 is transmitted alone by the control circuit 39 and the mixing circuit 41 to the reading and writing circuits 6 and to the writing network 8. The coded mark contained in the register 2 is then re-introduced into the memory 1, after the words and coded marks which have not been erased, at the location which was occupied by the coded mark which has been erased. Similarly, as a result of the pulses emitted by the outputs S1, S2, S3 and S4, the characters of the word located by the coded mark which has just been re-introduced into the memory are successively extracted from the memory 1 and then re-introduced into the memory after this coded mark, so that the characters and coded marks are ultimately stored in the memory in compact order, the words being introduced into the memory one after the other and separated from one another by their respective coded marks.

These operations continue until the instant when, after the extraction from the memory, the register 2 remains at zero. At this instant, the operations proceeding are those which will be described in paragraph IV.

*IV—Immediately after an extraction from the memory, the register 2 remains at zero*

If, after an extraction from the memory 1, by means of a pulse emitted by S2, the register 2 remains at zero, this means, since all the characters or coded marks are stored in the memory 1 one after the other without any intervals between them, that, in the course of its progression, the reading network 7 has just gone beyond that zone of the memory which was previously occupied by all the characters and coded marks. Whether or not a word in the memory has been erased, the writing network 8 has arrived at the first location in the memory zone available for the registration, since all the characters or coded marks previously extracted have been either erased or re-introduced into the memory one after the other and without intervals between them. The coded mark and the word contained in the memory 16 may then be re-introduced into the said available zone in the manner which will now be described. Owing to the fact that the register 2 is at zero, the output of the member 27 is brought to a positive voltage and, since the output IN is also brought to a positive voltage, a positive voltage is set up at the output of the AND circuit 25, which has the effect of rendering the control circuit 31 conductive. A pulse emitted by S3 is transmitted by this circuit 31 to the mixing circuits 47 and 48. The pulse transmitted by the circuit 47 is sent to the trigger circuit B3, which is positioned in the state "0". Consequently, the control circuit 39 is conductive. The pulse transmitted by the circuit 48 is sent to the control member 19, so that the reference coded mark contained in the store 16 is transferred to the register 2. At the same time, a column shift occurs in the memory 16 so as to enable the first character of the word contained in this memory to be stored in the first location in the said memory in order subsequently to be transferred to a register 2. A pulse emitted by S4 is transmitted by the control circuit 39 and is then sent through the mixing circuit 41, on the one hand, to the reading and writing circuits 6, and on the other hand to the writing network 8. Consequently, the coded mark contained in the register 2 is introduced into the memory 1, in the first location of the empty zone.

The succeeding operations by means of which the word contained in the memory 16 can be similarly transferred, character by character, into the following columns of memory 1 by means of the pulses emitted by the auxiliary generator 35 will not be further described.

These operations stop when the last character of the word initially contained in the memory 16 has been transferred and the indicator 50 detects the absence of characters in the memory 16. The output of this indicator is then brought to a positive potential, whereby the control circuit 51 is rendered conductive.

After the successive emission of pulses by the outputs S1 and S2, a pulse is emitted by S3, successively transmitted by the circuits 31, 48, 51 and 44, and causes the trigger circuit B1 to change to the state "0", whereby the control circuit 38 is rendered non-conductive. The output pulse, applied by means of the conductor 37 to the control circuit 38, is then blocked, whereby the generator 35, and consequently the assembly of devices, are stopped.

B—Erasure of a word contained in the memory 1

When a word located by a coded mark and stored in the memory 1 is to be erased, the switching circuits 15 are set in operation in such manner that the register 17 and the first location in the memory 16 contain a coded mark identical to that which, in the memory 1, locates the word which it is desired to erase. The instruction which relates to the erasing operation has been decoded by the instruction decoder 22 and the output EF alone is brought to a positive potential.

Referring to FIGURE 7, it will be seen that the operations which commence are the preliminary operations. These operations are identical to those which have been described in paragraph I with reference to the introduction of a word into the memory. For this reason, they will not be described in order that the text may not be overloaded. It will merely be pointed out that at the end of these preliminary operations the coded mark contained in the register 17 has been successively transferred into the register 2 and then into the register 9, that the two networks 7 and 8 have been returned to the initial position, that the trigger circuit B1 has been brought to the state "1", that the trigger circuits B2 and B3 have been brought to the state "0", and finally that a pulse has been transmitted to the input 36 of the auxiliary generator 35 for starting this generator.

FIGURE 7 indicates that the consecutive operations at the starting of the generator enable the first coded mark contained in the memory 1 to be extracted from this memory. These operations have been described in paragraph II, and for this reason they will not again be dealt with. It will merely be pointed out that at the end of these operations the coded mark extracted is contained in the register 2. Two cases, indicated in FIGURE 7, may then arise. If the coded mark contained in the register 2 is identical to that contained in the register 9, the operations which proceed are identical to those described in paragraph IIa. If, on the other hand, the coded mark contained in the register 2 is different from that contained in the register 9, the operations which proceed are identical to those described in paragraph IIb.

It will simply be indicated that in the case where the register 2 contains a coded mark identical to that contained in the register 9, the advance of the writing network is temporarily stopped, and that the coded mark contained in the register 2 is erased when this register is returned to zero. As the reading network progresses, the characters of the word located by the coded mark which has just been erased are successively extracted from the memory 1, but not re-introduced into the latter, which results in their erasure at the successive returns to zero of the register 2. After erasure of the last character of this word, a further extraction from the memory is effected, and FIGURE 7 shows that two cases may then arise: either the register 2 contains a coded mark different from that contained in the register 9, and in this case the operations which proceed are identical to those described in paragraph III, or the register 2 has remained at zero, and in this case the operations which proceed are those which will hereinafter be described in paragraph V.

Referring again to the case concerning the performance of the operations described in paragraph IIb, it will be indicated that in the course of these operations the characters or coded marks which are successively extracted from the memory are re-introduced into the latter, at the locations in which they were registered before their extraction. This process continues until the instant when one of the following cases arises. In the first case, the register 2 contains a coded mark identical to that contained in the register 9, and in this case the operations which proceed are identical to those described in paragraph IIa, and in the second case the register 2 is returned to zero as a result of an extraction, and in this case the operations which proceed are those which will be described in paragraph V.

If, immediately after the erasure of the word which it was desired to erase, the register 2 contains as a result of a further extraction, a coded mark different from that contained in the register 9, the operations which proceed are identical to those described in paragraph III. In the course of these operations, as has been described in paragraph III, the characters and coded marks which have not yet been extracted from the memory 1 are extracted from this memory and then re-introduced in a compact arrangement, the words being introduced one after the other and being separated from one another by their respective coded marks.

These operations continue until the instant when, as a result of an extraction, the register 2 has remained at zero. At this instant, the operations which proceed are those which will be described in paragraph V.

V—As a result of an extraction, the register 2 has remained at zero

If, after an extraction from the memory 1, by means of a pulse emitted by S2, the register 2 has remained at zero, this means that the reading network 7, in the course of its exploration, goes beyond that zone of the memory which is occupied by all the characters and coded marks introduced into it and that, since the characters and coded marks have been either erased or reintroduced one after the other without intervals between them, the writing network 8 has now reached the first location in the zone of the memory which is available for the registration. Since, in the present case, no new word has to be introduced into the memory, the advance of this writing network 8 will be stopped in the manner which will now be described. Since the register 2 is at zero, the output of the state indicator 27 of the auxiliary register is brought to a positive potential and since the output EF is also brought to a positive potential, a positive voltage is set up at the output of the AND circuit 24, which has the effect of rendering the control circuit 32 conductive. A pulse emitted by S3 is transmitted by this circuit 32 to the mixing circuits 48 and 49. The pulse transmitted by the circuit 49 is sent to the trigger circuit B3, which changes to the state "1." The pulse transmitted by the circuit 48 is sent to the control member 19, so that the coded mark contained in the memory 16 is transferred to the register 2. Since the memory 16 initially contained only this coded mark, it is therefore now empty, and the state indicator 50 of the buffer memory detects the absence of any character in the memory 16. The output of the indicator 50 is then brought to a positive voltage, whereby the control circuit 51 is rendered conductive.

The trigger circuit B3 is in the state "1," but owing to the fact that the output EX is not brought to a positive potential the output of the AND circuit 42 is not brought to a positive potential, which has the effect of rendering the control circuit 40 non-conductive. The control circuit 39 is also not rendered conductive, so that a pulse emitted by S4 is blocked by the circuits 39 and 40. Consequently, the writing network cannot advance owing to the fact that the trigger circuit B3 is in the state "1." The output pulse applied by means of the conductor 37 to the control circuit 38 is transmitted by this circuit 38 to the input 36 of the auxiliary generator 35. The looping having been effected, a new series of pulses will be successively emitted by the outputs S1, S2, S3 and S4 of this generator. The pulse emitted by S1 returns the register 2 to zero and therefore erases the coded mark which was contained in this register. The pulse emitted by S2 permits a further extraction from the memory, but since the reading network 7 now explores the memory zone in which no character or coded mark is registered, the register 2 remains at zero. Consequently, the output of the indicator 27 is brought to a positive potential. The output EF having been brought to a positive potential, that of the circuit 24 is also brought to a positive potential and consequently the control circuit 32 is rendered conductive. A pulse emitted by S3 is transmitted by the circuit 32 to the mixing circuits 48 and 49. The pulse transmitted by the circuit 49 leaves the trigger circuit B3 in the state "1," while the pulse transmitted by the circuit 48 is sent on the one hand to the control member 19 and on the other hand to the control circuit 51. The memory 16 being empty, no character or coded mark is transferred to the register 2. The pulse sent to the control circuit 51, which has been rendered conductive as has been explained in the foregoing, is transmitted by this circuit and by the mixing circuit 44 to the trigger circuit B1, which changes to the state "0." Consequently, the control circuit 38 is rendered non-conductive.

The trigger circuit B3 being in the state "1" and the output EX not having been brought to a positive potential, the control circuits 39 and 40 are then rendered nonconductive and block a pulse emitted by S4. Finally, the output pulse applied by means of the conductor 37 to the control circuit 38 is blocked by this circuit, which results in the stopping of the auxiliary generator 35 and consequently the stopping of all the devices.

*C—Extraction of a word contained in the memory 1*

When a word, located by a coded mark and stored in the memory 1, is to be extracted and transferred from this memory, the switching circuits 15 are set in operation so that the register 17 alone contains a coded mark identical to that which, in the memory 1, locates the word which it is desired to extract. In this case, the memory 16 contains neither character nor coded mark. The instruction which relates to the operation of extraction without erasure has been decoded by the instruction decoder 22 and the output EX alone is brought to a positive potential.

Referring to FIGURE 8, it will be observed that the operations which commence are the preliminary operations. These operations are identical to those which have been described in paragraph I and for this reason they will not be dealt with again so as not to lengthen the description. It will merely be pointed out that at the end of these preliminary operations the coded mark contained in the register 17 has been successively transferred into the register 2 and then into the register 9, that the two networks 7 and 8 have been returned to the initial position, that the trigger circuit B1 has been brought into the state "1," that the trigger circuits B2 and B3 have been brought to the state "0," and finally that a pulse has been transmitted to the input 36 of the auxiliary generator 35 for starting this generator.

FIGURE 8 indicates that the operations consecutive upon the starting of the auxiliary generator enable the first coded mark contained in the memory 1 to be extracted from this memory. These operations have been described in paragraph II, and for this reason they will not be dealt with again. It will be pointed out that at the end of these operations the coded mark extracted is contained in the register 2. Two cases, indicated in FIGURE 8, may then arise. If the coded mark contained in the register 2 is identical to that contained in the register 9, the operations which proceed are those which will be described in the following in a paragraph VI. If, on the other hand, the coded mark contained in the register 2 is different from that contained in the register 9, the operations which proceed are identical to those described in paragraph IIb. In this case, the characters and coded marks which are successively extracted from the memory are reintroduced into the latter, at the locations in which they were stored before their extraction. This process continues until the instant when one of the following cases arises. In the first case, the register 2 contains a coded mark identical to that contained in the register 9 and in this case the operations which proceed are those which will be described in paragraph VI. In the second case, after a pulse has been despatched by S2 the register 2 has remained at zero as a result of an extraction. This means that the reading network 7, in the course of its exploration, goes beyond the memory zone occupied by all the characters and coded marks and that, since no word has yet been transferred to the memory 16, the word which it is desired to extract has not been found and is not stored in the memory 1. In this case, the output of the member 27 is brought to a positive voltage and, since the output EX is also at a positive potential, the output of the AND circuit 26 is brought to a positive potential, which renders the control circuit 30 conductive. A pulse is then emitted by S3, is transmitted only by the control circuit 30 and is then transmitted on the one hand through the mixing circuit 44 to the trigger circuit B1, which then changes to the state "0," and on the other hand through the mixing circuit 47 to the trigger circuit B3, which therefore changes to the state "0." The positioning of these trigger circuits renders the control circuit 39 conductive, while the control circuit 38 is rendered non-conductive. A pulse emitted by S4 is transmitted by the circuit 39 and the mixing circuit 41 to the writing network 8 and to the reading and writing circuits 6, but owing to the fact that the register 2 is at zero, no character or coded mark is then reintroduced into the memory 1. Finally, the output pulse, applied by means of the conductor 37 to the control circuit 38, is blocked by this circuit, which brings about the stopping of the generator 35 and consequently the stopping of all the devices.

It will now be considered what happens when, after the despatch of a pulse by S2, the register 2 contains a coded mark extracted from the memory 1, and this coded mark is identical to that contained in the register 9.

*VI—As a result of an extraction, the register 2 contains a coded mark identical to that contained in the register 9*

In this case, the output of the AND circuit 12 is brought to a positive potential, which renders the control circuit 29 conductive. A pulse is then emitted by S3 and transmitted by the circuit 29 and the mixing circuit 49, which brings about the positioning of the trigger circuit B3 in the state "1." Consequently, and owing to the fact that the output EX is brought to a positive potential, the output of the AND circuit 42 is brought to a positive potential, whereby the control circuit 40 is rendered conductive. Owing to the fact that the circuit 39 is non-conductive, a pulse emitted by S4 is transmitted only by the circuit 40. This pulse is then directed to the trigger circuit B2, which is therefore positioned in the state "1," to the mixing circuit 41 and to the control member 20. It is transmitted by the circuit 41 and applied to the writing network 8 and to the reading and writing circuits 6, and thus renders possible the re-introduction into the memory 1 of the coded mark contained in the register 2. When applied to the control member 20, it initiates the transfer of the coded mark contained in the register 2 to the memory 16. In this way, the coded mark contained in the register 2 is simultaneously stored in the two memories 1 and 16. Since the trigger circuit B1 has been positioned in the state "1," the control circuit 38 is conductive, which enables the output pulse to be transmitted to the input 36. A further series of pulses emitted by S1, S2, S3 and S4 enables the first character of the word located by the coded mark which has just been transferred into the memory 16 to be successively extracted from the memory 1 and introduced, on the one hand, into the memory 16 and on the other hand and simultaneously into the memory 1, at the location at which it was previously registered.

The operations by which all the characters of the word which it is desired to extract are similarly enabled to be successively extracted from the memory and then introduced both into the memory 1, at the locations which they previously occupied, and into the memory 16, will not be described.

This process continues until the instant when one of the following two cases arises: in the first case, the register 2, as a result of an extraction has remained at zero; in the second case, the register 2, as a result of an extraction, contains a coded mark different from that contained in the register 9.

If, in accordance with the first case, the register 2 has remained at zero, this results in the appearance of a positive voltage at the output of the indicator 27 and consequently at the output of the AND circuit 26. The control circuit 30 is then rendered conductive, so that a pulse emitted by S3 is transmitted by the circuit 30 and is applied through the mixing circuits 44 and 47, on the one hand to the trigger circuit B1 and on the other hand to the trigger circuit B3. The trigger circuit B1 then changes to the state "0," thus rendering the circuit 38 non-conductive, while the trigger circuit B3 is positioned in the state "0," thus rendering the circuit 39 conductive and the circuit 40 non-conductive. A pulse emitted by S4 is transmitted by the circuit 39 and the mixing circuit 41 to the writing network 8 and to the reading and writing circuits 6, but owing to the fact that the register 2 is at zero no character or coded mark is then reintroduced into the memory 1. Finally, the output pulse, which is applied by means of the conductor 37 to the circuit 38, is blocked by this circuit, which results in the stopping of the generator 35 and consequently in the stopping of all the devices.

If, in accordance with the second case, the register 2 contains a coded mark different from that contained in the register 9, the output of the AND circuit 13 is brought to a positive potential, whereby the control circuit 28 is rendered conductive. A pulse emitted by S3 is then transmitted by this circuit, on the one hand through the mixing circuit 47 to the trigger circuit B3, which is then positioned in the state "0," and on the other hand to the control circuit 43. As has been explained in the foregoing, the trigger circuit B2 has been positioned in the state "1" by a pulse transmitted by the circuit 40 and the circuit 43 has thus been rendered conductive. The pulse coming from the circuit 28 is then transmitted through the circuit 43 and the mixing circuit 44 to the trigger circuit B1, which changes to the state "0." Consequently, the control circuit 38 is rendered non-conductive. The control circuit 39 is rendered conductive owing to the fact that the trigger circuit B3 is in the state "0." A pulse emitted by S4 is then transmitted by the circuit 39 and the mixing circuit 41 to the writing network 8 and to the reading and writing circuits 6, so that the coded mark contained in the register 2 can be re-introduced into the memory 1. Finally, the output pulse, which is applied to the circuit 38 by means of the conductor 37, is blocked by this circuit, whereby the generator 35 is stopped, and all the devices are thus also stopped.

All the operations which have just been described relate to the introduction of a word into the memory 1, to the erasure of a word in this memory or to the extraction of a word, with re-introduction into the said memory. For this purpose, three types of instruction are employed, called introduction, erasure and extraction. However, it is obvious that they could be limited to two types of instruction called introduction and extraction. In this case, the extraction of a word from the memory 1 would take place without re-introduction of this word into the said memory. The construction of the distributor would of course be simpler than that illustrated in FIGURE 1A, but the advantage of not having to re-introduce this word into the memory as a result of an extraction of the word would then be lost.

It would also be possible without departing from the subject of the invention to provide the memory 1 with interrogation circuits by means of which it would be possible, without changing the nature of the registered data, to locate the coded marks in the memory and thereafter to identify by comparison that one of the said coded marks which constitutes the coded mark which is sought, so that it would be unnecessary to seek the latter in the whole memory by a sequential process.

I claim:

1. System for automatically handling data distributed in the form of words each comprising an identifying special character called a "coded mark" and variable number of normal characters, said system comprising a sequential access memory comprising bistable magnetic elements arranged in a plurality of rows and in $n$ columns, each column being adapted to store any one of said characters, and including a read drive conductor and a write drive conductor, said elements being further coupled to a plurality of bit and sense conductors, said system further comprising two column selecting switches having a number $n$ of stages, the first being associated with the memory for effecting the sequential extraction of the characters, and the second being associated with the memory for effecting the sequential introduction or the sequential restorage of characters, an advance pulse generator operating cyclically and connected to the said first switch so that the latter advances by one stage at each pulse received from the generator, an auxiliary register having a capacity of one character connected to input-output circuits of the said matrix memory to contain a character extracted or to be introduced, a comparison register containing a reference coded mark identifying a word to be erased in the memory, a comparator device connected to compare, from the said comparison register and from the said auxiliary register, the said reference coded mark with a coded mark extracted from the matrix memory, and a logical control device comprising switching means under the control of the said comparator and adapted to transmit retarded advance pulses from the said generator to the said second switch as long as the compared coded marks are different, then to prevent the transmission of pulses to the said second switch as soon as the compared coded marks are identical and finally to permit further transmission of said pulses as soon as the compared coded marks are again different.

2. Automatically handling system according to claim 1, wherein there are provided a state detecting device which is associated with the said auxiliary register, and a stopping device for monitoring the operation of the said pulse generator, the said logical control device being arranged to stop the operation of the said pulse generator as soon as the said state detecting device has established vacancy of the said auxiliary register, i.e. after the last character previously stored in the memory has been restored.

3. System for automatically handling data distributed in the form of words each comprising an identifying special character called a "coded mark" and a variable number of normal characters, said system comprising a sequential access memory comprising bistable magnetic elements arranged in a plurality of rows and in $n$ columns, each column being adapted to store any one of said characters, and including a read drive conductor and a write drive conductor, said elements being further coupled to a plurality of bit and sense conductors, said system further comprising two column selecting switches having a number $n$ of stages, the first being associated with the memory for effecting the sequential extraction of the characters, the second being associated with the memory for effecting the sequential introduction or the sequential restorage of characters, an advance pulse generator operating cyclically and connected to the said first switch so that the latter advances by one stage at each pulse received from the generator, an auxiliary register having a capacity of one character connected to input-output circuits of the said matrix memory to contain an extracted character or a character to be introduced, a buffer memory storing a word to be introduced into the matrix memory, first switching circuits adapted to connect the output of the said buffer memory to the said auxiliary register, a comparison register for containing a reference coded mark identifying the said word to be introduced, a comparator device connected to compare from the said comparison register and from the said auxiliary register the said coded word mark with the coded marks extracted from the matrix memory, a state detecting device which is associated with the said auxiliary register, and a logical control device comprising second switching means, which is on the one hand under the control of said comparator and is adapted to transmit retarded advance pulses from the said generator to the said second switch as long as the compared coded marks are different, and the said device is on the other hand under the control of the said state detecting device to monitor the said first switching circuits so that the latter permit the transfer of the word to be introduced when the said state detecting device establishes vacancy of the said auxiliary register.

4. A system for automatically handling data stored in a core memory, in the form of words, each comprising an identifying special character called a coded mark followed by a variable number of normal characters, said system comprising:

a sequential access memory consisting of a plurality of columns, each comprising $p+1$ bistable magnetic elements to store the $p$ bits of a word character or the $p+1$ bits of a coded mark, a write drive wire and a read drive wire, said elements being further coupled to a plurality of bit and sense wires, a first selecting switch connected to energize sequentially the said read drive wires, in a predetermined order from the first memory column, a second selecting switch connected to energize sequentially the said write drive wires in said predetermined order, an advance pulse generator to generate iterative groups of sequential pulses, each group defining a memory cycle and comprising a reset pulse, a reading selecting pulse, a control pulse and a writing selecting pulse, in this order, writing and reading circuits associated to said memory to permit the extraction or the storage of any character in the memory, connecting means between said pulse generator on one hand, and said writing and reading circuits and said first selecting switch on the other hand to unconditionally transmit to them a reading selecting pulse sent by the generator, an auxiliary register having $p+1$ positions associated to said memory to contain temporarily any character extracted or to be introduced, a comparison register containing a reference coded mark, a comparator connected to said auxiliary register and to said comparison register to compare the said reference coded mark with any character extracted from the memory, and a logical device including first switching means under the control of said comparator and adapted to transmit to said second selecting switch and to said writing and reading circuits the successive writing selecting pulses sent by the generator when the compared coded marks are different, and to prevent the transmission of said pulses when the compared coded marks are identical.

5. A system for automatically handling data stored in a memory, according to claim 4, said system further comprising a buffer memory to store a coded mark followed by a further word to be written in the core memory, said buffer memory consisting of a plurality of stages, each comprising $p+1$ bistable storage elements, and associated with means for shifting its contents by one stage towards an output stage thereof, switching circuits adapted to connect the output stage of said buffer memory to the auxiliary register, a state detecting device associated with said auxiliary register to generate a signal indicating the vacancy of the auxiliary register, and second switching means, included in said logical device, connected to said state detecting device to receive the said signal, and adapted to transmit a control pulse from the generator to said second switching circuits so that the latter permit the transfer of any character stored in the output stage of the buffer memory to the auxiliary register, when the state detecting device has established vacancy of said register.

6. A system for automatically handling data stored in a memory, according to claim 5, said system further comprising:
   a second state detecting device associated with the output stage of the buffer memory to generate a signal indicating vacancy of said output stage, and
   means for stopping said generator comprising a bistable element which is adapted to stop the generator when it is in its first state, said bistable element being initially in its second state, and a coincidence circuit connected to said second state detecting device and to the second switching circuits to transmit a control pulse from said switching circuits to said bistable element to change it from its second state to its first state, when the second state detecting device has established vacancy of the output stage of the buffer memory.

7. A system for handling data words, each comprising an identifying special character called a coded mark, and a variable number of normal characters, said system comprising:
   a sequential access memory comprising bistable magnetic elements arranged in a plurality of rows and in $n$ columns, each column being adapted to store any one of said characters, and including a read drive conductor and a write drive conductor, said elements being further coupled to a plurality of bit and sense conductors,
   a first selecting switch connected to energize sequentially the said read drive conductors, in a predetermined order from the first memory column,
   a second selecting switch connected to energize sequentially the said write drive conductors, in said predetermined order,
   an advance pulse generator to generate iterative groups of a sequential pulses, each group defining a memory cycle and comprising a reset pulse, a reading selecting pulse, a control pulse and a writing selecting pulse, in this order,
   writing and reading circuits associated to said memory to permit the extraction or the storage of any character in the memory,
   connecting means between said pulse generator on one hand, and said writing and reading circuits and said first selecting switch on the other hand to unconditionally transmit to them a reading selecting pulse sent by the generator,
   an auxiliary register associated to said memory to contain temporarily any one character extracted from or to be introduced in the memory,
   a comparison register containing a reference coded mark,
   logical comparing means connected to said auxiliary register and to said comparison register, and having means for distinguishing a registered coded mark from a registered normal character, the comparing means having two output terminals to indicate whether two compared coded marks are equal or not,
   and a logical device including switching means under the control of said comparing means and adapted to transmit to said second selecting switch and to said writing and reading circuits the successive writing pulses sent by the generator, so that, when one or several words are initially stored in a first memory zone beginning with the first memory column, the latter always storing the coded mark associated to a first word, the arrangement is such that
   either said first and second selecting switches are made operative alternately in each memory cycle and repeatedly for reading-out and restorage of a first word, then of the eventual following words into consecutive columns, each time and as long as said comparing means has supplied a result of unequality,
   or else, said first selecting switch alone is made operative in each memory cycle, for erasing a prior stored word for which comparing means has detected the equality of its coded mark and of said reference coded mark,
   and then said first and second selecting switches are made again operative alternately in each memory cycle and repeatedly for reading-out and restorage of the following word or words, each time and as long as said comparing means has supplied a result of unequality, with the result that the first coded mark found unequal is restored in the storage column which previously stored said coded mark found equal to said reference coded mark.

References Cited
UNITED STATES PATENTS

| | | |
|---|---|---|
| 3,108,256 | 10/1963 | Buchholz et al. _____ 340—172.5 |
| 3,108,257 | 10/1963 | Buchholz. |
| 3,251,036 | 5/1966 | Coil et al. |

ROBERT C. BAILEY, *Primary Examiner.*

R. ZACHE, P. L. BERGER, *Assistant Examiners.*